United States Patent Office 3,254,086
Patented May 31, 1966

3,254,086
ESTERS OF 4-ANILINOPYRIMIDINE-5-CARBOXYLIC ACIDS
Peter F. Juby, Syracuse, N.Y., assignor to Bristol-Myers Company, New York, N.Y., a corporation of Delaware
No Drawing. Filed Dec. 16, 1963, Ser. No. 330,554
2 Claims. (Cl. 260—256.4)

This invention relates to certain novel compounds useful as analgesic agents and, more particularly, to (lower) alkyl esters of 4-(2',3'-dimethylanilino)pyrimidine-5-carboxylic acid.

It was the object of the present invention to provide novel and nontoxic analgesic agents.

The object of the present invention has been achieved by the provision, according to the present invention, of an ester of the formula

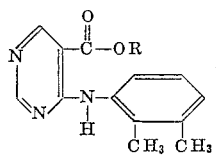

wherein R represents (lower)alkyl. The preferred embodiment of the present invention is the compound of the formula given above in which R represents ethyl.

The compounds of the present invention are prepared by the reaction of 4-chloro-5-ethoxycarbonylpyrimidine [Chem. Ber., 95, 803 (1962)], or another corresponding (lower)alkyl ester with 2,3-dimethylaniline, preferably by heating, as to reflux, in an inert solvent such as benzene. Roughly two moles of the 2,3-dimethylaniline are used per mole of the pyrimidine or, if desired, equimolar amounts are used with the addition of a mole of a typical hydrogen halide acceptor such as a tertiary amine or an alkali metal carbonate. In the former case, a mole of 2,3-dimethylaniline hydrochloride precipitates by the end of the reaction and is removed, as by filtration. The reaction product is isolated by such means as filtration or freeze-drying or evaporation of the solvent in vacuo. If desired for the preparation of other (lower)alkyl esters, an ethyl ester so produced is easily saponified in the usual manner, e.g. with aqueous potassium hydroxide, to give the free acid which is then converted by conventional means to any other desired (lower)alkyl ester, e.g., to the methyl ester by treatment with diazomethane.

As used herein the term (lower)alkyl signifies monovalent aliphatic radicals, whether branched or unbranched, which contain from one to six carbon atoms, inclusive, e.g. methyl, ethyl, propyl, isopropyl, n-butyl, sec.-butyl, tert.-butyl, isobutyl, n-hexyl, isohexyl, etc.

The 4-(2',3'-dimethylanilino)-5-ethoxycarbonylpyrimidine of the present invention was tested for analgesic activity by the phenylquinone test of Sigmund et al., Proc. Soc. Expt'l. Biol. and Med., 95, 729 (1957), in which an analgesic reduces the induced writhing of the mice. At dosages of 150 mgm./kg. p.o. in mice the reduction in induced writhing at the end of the first hour was found to be 65% for aspirin and 53% for that compound of the present invention. This indicated that it is an analgesic agent with a potency of the order of that of aspirin.

This result was surprising in view of the fact that no significant indication of analgesic activity was produced in the test described above by the corresponding free acid or by the corresponding compound (as the ethyl ester) containing a single methyl group in either the m- or p-position or by the corresponding compounds (as either ethyl esters or free acids) which lacked the two methyl groups in the o- and m-positions but were substituted in the benzene ring with m-trifluoromethyl or meta chloro group or m,m-dichloro.

The following example will serve to illustrate, but not to limit, the present invention. All temperatures are given in degrees centigrade.

Example

4 - (2,3 - dimethylanilino) - 5 - ethoxycarbonylpyrimidine.—2,3-dimethylaniline (11.1 g.) was added, with stirring, to a solution of 4-chloro-5-ethoxycarbonylpyrimidine [1] (8.5 g.) in dry benzene (60 ml.). The solution was heated under reflux for one hour. The cooled reaction mixture was filtered and the filtrate was reduced to dryness. The residual solid (13.0 g.) was crystallized from aqueous methanol to give the colorless crystalline product, M.P. 89–90°.

Analysis.—Calcd. for $C_{15}H_{17}N_3O_2$: C, 66.40; H, 6.32; N, 15.49. Found: C, 66.10; H, 6.17; N, 15.70.

5 - carboxy - 4 - (2,3 - dimethylanilino)pyrimidine.— 4 - (2,3 - dimethylanilino) - 5 - ethoxycarbonylpyrimidine (0.5 g.) was suspended in an aqueous solution of 6% potassium hydroxide (12 ml.). The suspension was heated under reflux for 0.5 hr. The clear solution was cooled and acidified with concentrated hydrochloric acid. The precipitated solid was collected, and combined with a further quantity (4.0 g.) of the same material prepared in a similar manner from 4-(2,3-dimethylanilino)-5-ethoxycarbonylpyrimidine (4.4 g.). The combined products were crystallized from ethanol (×2) to give a pale yellow crystalline product, M.P. 255–256°.

Analysis.—Calcd. for $C_{13}H_{13}N_3O_2$: C, 64.18; H, 5.39; N, 17.28. Found: C, 63.99; H, 5.44; N, 17.50.

I claim:
1. A compound of the formula

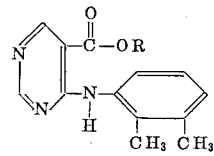

wherein R represents (lower)alkyl.
2. A compound of the formula

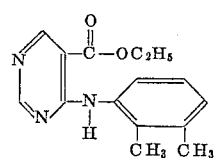

References Cited by the Examiner

Bredereck et al.: Chemische Berichte, vol. 95, pages 956–963, 1962.

---
[1] H. Brederick, F. Effenberger and E. H. Schweizer, Chem. Ber., 95, 803 (1962).

Peters et al.: Jour. Organic Chem., vol. 25, pages 2137–2142, December 1960.

Yale: Journal of Medicinal and Pharmaceutical Chemistry, vol. 1, No. 2, pages 121–132, 1959.

References Cited by the Applicant

UNITED STATES PATENTS

| | | |
|---|---|---|
| 2,724,710 | 11/1955 | Duschinsky. |
| 2,728,768 | 12/1955 | Leanza et al. |
| 2,785,161 | 3/1957 | Steck. |
| 2,862,974 | 12/1958 | Sieglitz. |
| 2,891,953 | 6/1959 | Clark et al. |
| 2,917,509 | 12/1959 | Druey. |
| 2,921,071 | 1/1960 | Druey et al. |
| 3,037,022 | 5/1962 | Lowrie. |

FOREIGN PATENTS

| | | |
|---|---|---|
| 61/832 | 6/1960 | South Africa. |

OTHER REFERENCES

Mtisui and Saito: C.A. 53, 5275 and 5276 (1959).

NICHOLAS S. RIZZO, *Primary Examiner.*
MARY O'BRIEN, *Assistant Examiner.*